March 6, 1928.

R. K. LEE 1,662,040

CHARGE FORMING DEVICE

Filed April 6, 1925

Inventor
R. Kenneth Lee

By Spencer, Senall & Hardman
his Attorneys

March 6, 1928. 1,662,040
R. K. LEE
CHARGE FORMING DEVICE
Filed April 6, 1925 4 Sheets-Sheet 2
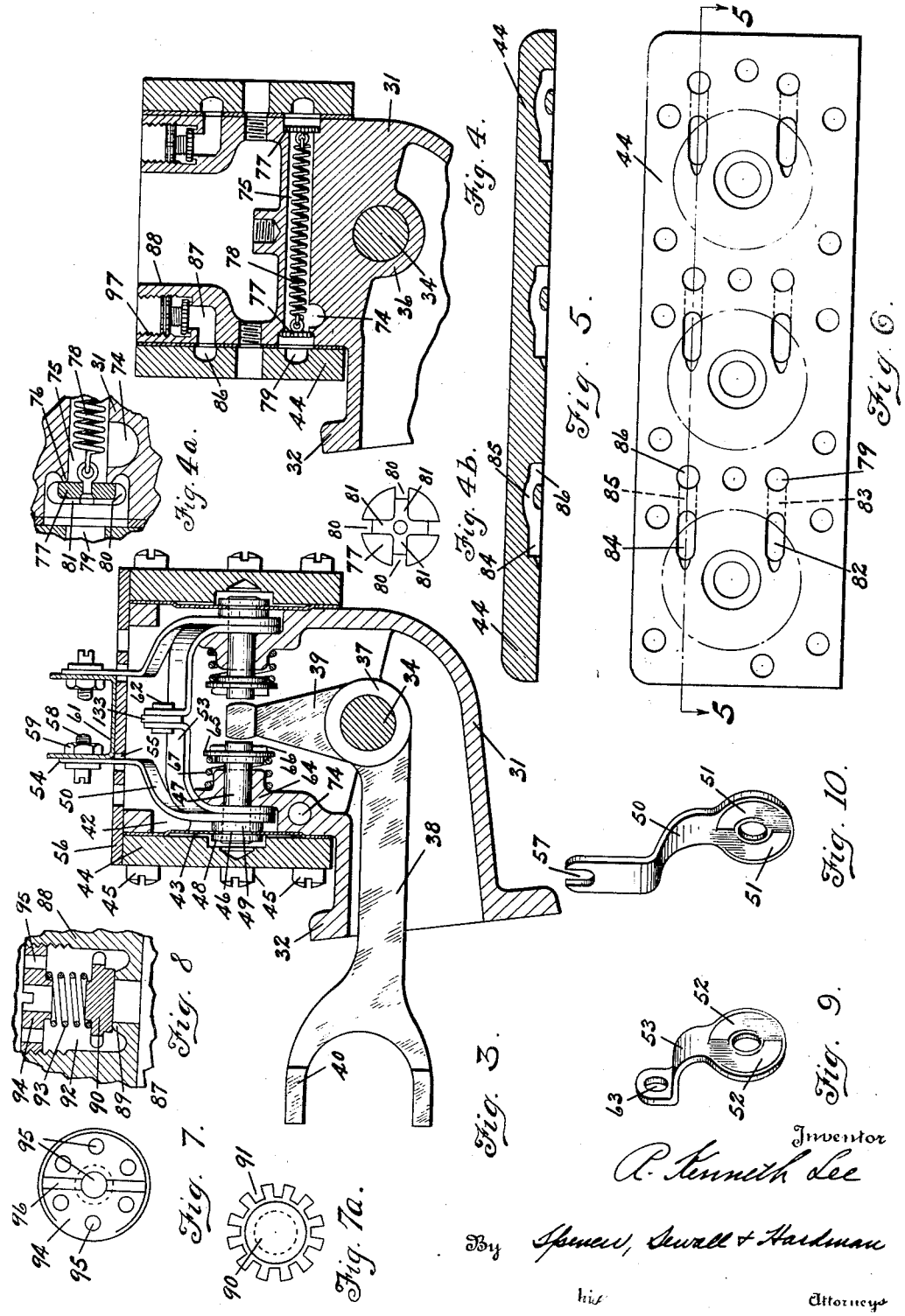

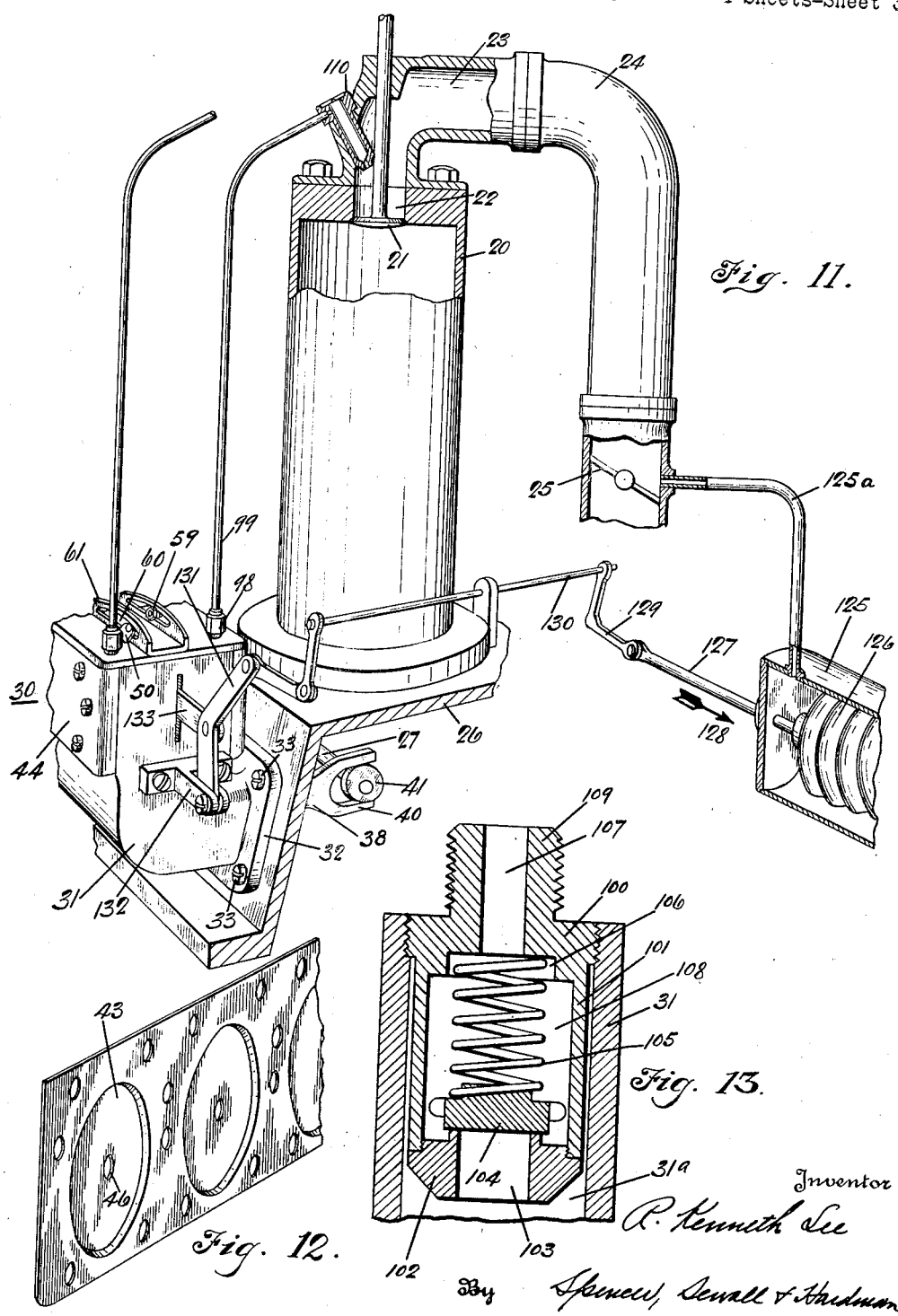

March 6, 1928.

R. K. LEE 1,662,040

CHARGE FORMING DEVICE

Filed April 6, 1925 4 Sheets-Sheet 4

Inventor
R. Kenneth Lee
By Spencer, Revell & Hardman
his Attorneys

Patented Mar. 6, 1928.

1,662,040

UNITED STATES PATENT OFFICE.

ROGER KENNETH LEE, OF DAYTON, OHIO, ASSIGNOR TO GENERAL MOTORS RESEARCH CORPORATION, OF DAYTON, OHIO, A CORPORATION OF DELAWARE.

CHARGE-FORMING DEVICE.

Application filed April 6, 1925. Serial No. 21,058.

This invention relates to improvements in a charge forming device of the injection type, for an internal-combustion engine.

It is among the objects of the present invention to deliver a measured charge of liquid fuel adjacent the intake port of an engine cylinder so that said charge can be conveyed into said cylinder by the flow of air thereinto, on its suction cycle.

Another object is to control the quantity of liquid fuel in the charge delivered and also to control the amount of air flowing into the cylinder on its suction cycle, both in accordance with engine conditions and requirements so that the proportion of liquid fuel and air will remain substantially constant during varying engine conditions.

A further object is to utilize the initial opening of the intake port of the engine cylinder to atomize a substantial portion of the liquid fuel while it is being drawn into the engine cylinder.

Further objects and advantages of the present invention will be apparent from the following description, reference being had to the accompanying drawings, wherein preferred forms of the present invention are clearly shown.

The above-mentioned objects are attained by providing a fuel delivery means having communication with the intake port of the engine cylinder and operated in such time relation to the cycle of operation of the engine cylinder, that, in engines of the overhead-valve type, the liquid fuel charge will be delivered into the intake port of the cylinder before it is opened and in engines of the L-head type the delivery will take place while said port is open during the intake cycle of the cylinder whereby the inrushing air will convey the said charge into the cylinder in both instances.

The proportion of the liquid fuel and the air is held substantially constant during varying engine conditions by means of apparatus adapted to adjust the delivery capacity of the fuel delivery means in accordance with the suction in the air intake conduit. A throttle valve in said conduit may be operated to control the air flowing through said conduit.

In engines of the overhead-valve type, the fuel delivery means is so timed that it will inject its fuel charge into the intake port of the cylinder while said port is closed so that as soon as the port is opened on the suction cycle of the cylinder the air rushing through this minute opening will carry with it a portion of the fuel charge which due to this small opening will be atomized to a greater degree than that portion of the fuel conveyed into the cylinder when the port opening is of larger size.

In the drawings:

Fig. 3 is a transverse section taken along the line 3—3 of Fig. 2. Certain parts are shown in elevation for the sake of clearness;

Fig. 4 is a transverse section taken along the line 4—4 of Fig. 1;

Figure 14:
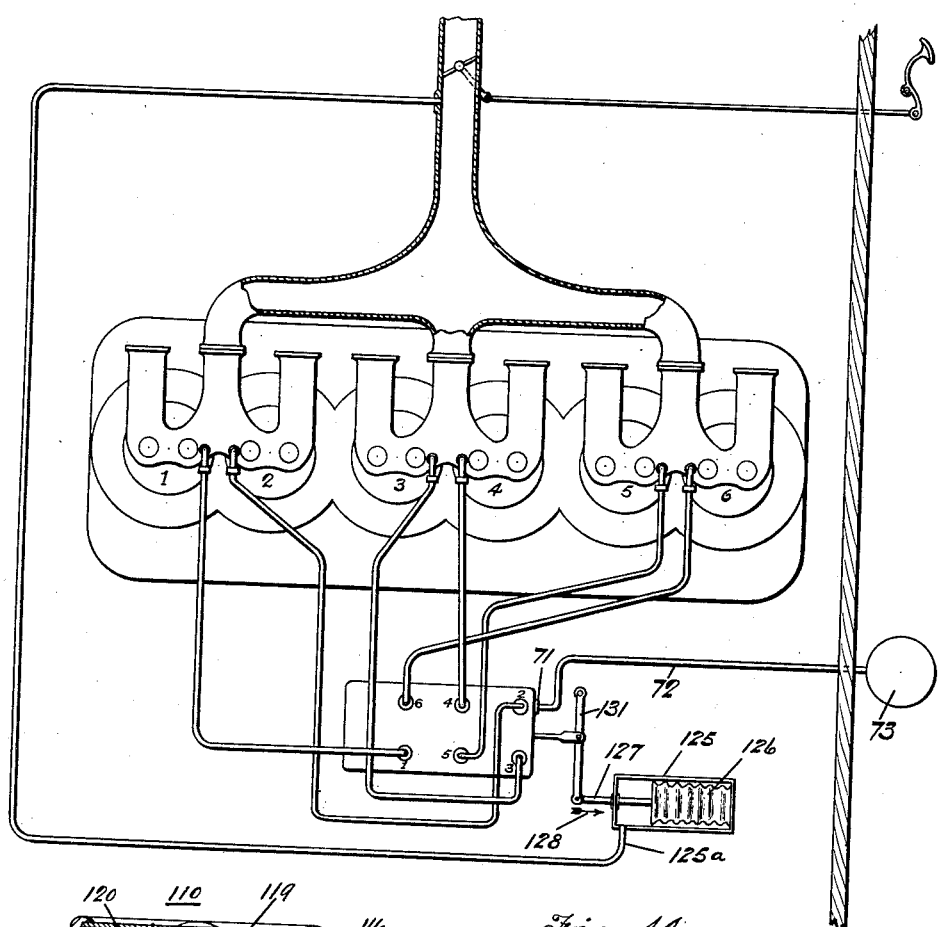
Figure 15:
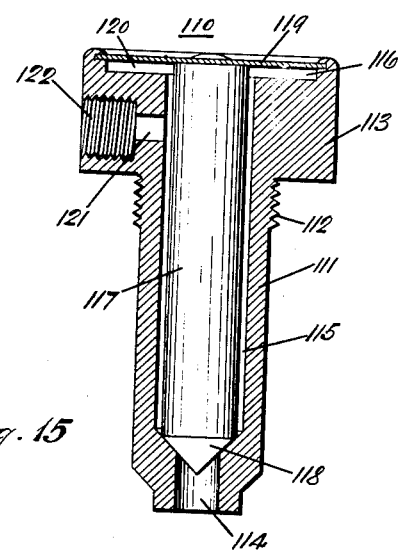

Fig. 4$^a$ is a detail sectional view of an intake valve of the pump;

Fig. 4$^b$ is a detail view of the intake valve;

Fig. 5 is a sectional view of the side plate of the pump taken along line 5—5 of Fig. 6;

Fig. 6 is a side view, interior, of the plate illustrated in Fig. 5;

Fig. 7 is a detail view of the adjusting plate of the exhaust valve mechanism;

Fig. 7$^a$ is a detail view of an exhaust valve;

Fig. 8 is a detail sectional view of an exhaust valve mechanism;

Fig. 9 is a detail view of one of the pump-regulating cam levers;

Fig. 10 is a detail perspective view of one of the pump adjusting cam levers;

Fig. 11 is a fragmentary view showing the charge-forming device as used in connection with an internal-combustion engine of the overhead-valve type;

Fig. 12 is a fragmentary perspective view of the diaphragm element;

Fig. 13 is a modified form of an exhaust valve member of the pump;

Fig. 14 is a diagrammatic view of a charge forming device showing the relative connections between the exhaust valves of the pump units and their respective cylinders;

Fig. 15 is a transverse sectional view of one of the injection nozzles; and

Figure 16:
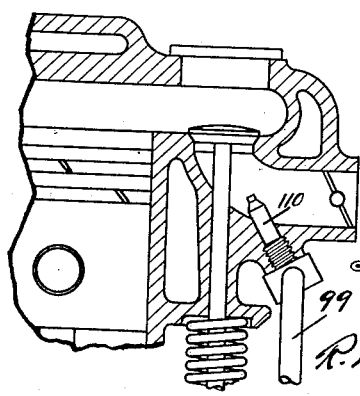

Fig. 16 is a fragmentary sectional view showing the method of positioning the injection nozzle in an internal-combustion engine of the L-head type.

Referring to the drawings, and more particularly to Fig. 11, there is shown an internal-combustion engine cylinder 20, provided with a valve 21 of the overhead type. The mechanism for operating this valve may be of any standard type and, therefore, none of this mechanism has been shown in the drawings. The valve 21 is adapted to be held in engagement with a seat formed in one edge of the intake port 22 of cylinder 20. An air conduit 23 is secured to the cylinder 20 in any suitable manner, so that said conduit communicates with the intake port 22. An extension 24 is secured to the conduit 23, said extension being provided with a manually-controlled throttle valve 25, which is adapted to control the amount of air flowing through the conduit 23. The engine cylinder 20 is secured to the crankcase housing 26 in any desirable manner. 27 designates the cam shaft of the engine.

The means for delivering a metered charge of liquid fuel to the intake port of the engine, comprises the pump 30 which includes a housing 31 provided with a flange 32, which is adapted to be secured to the side of the crankcase 26 by means of screws 33. In a pump for multicylinder internal-combustion engines the housing 31 is adapted to contain a plurality of pumping units.

Figures 1, 2:
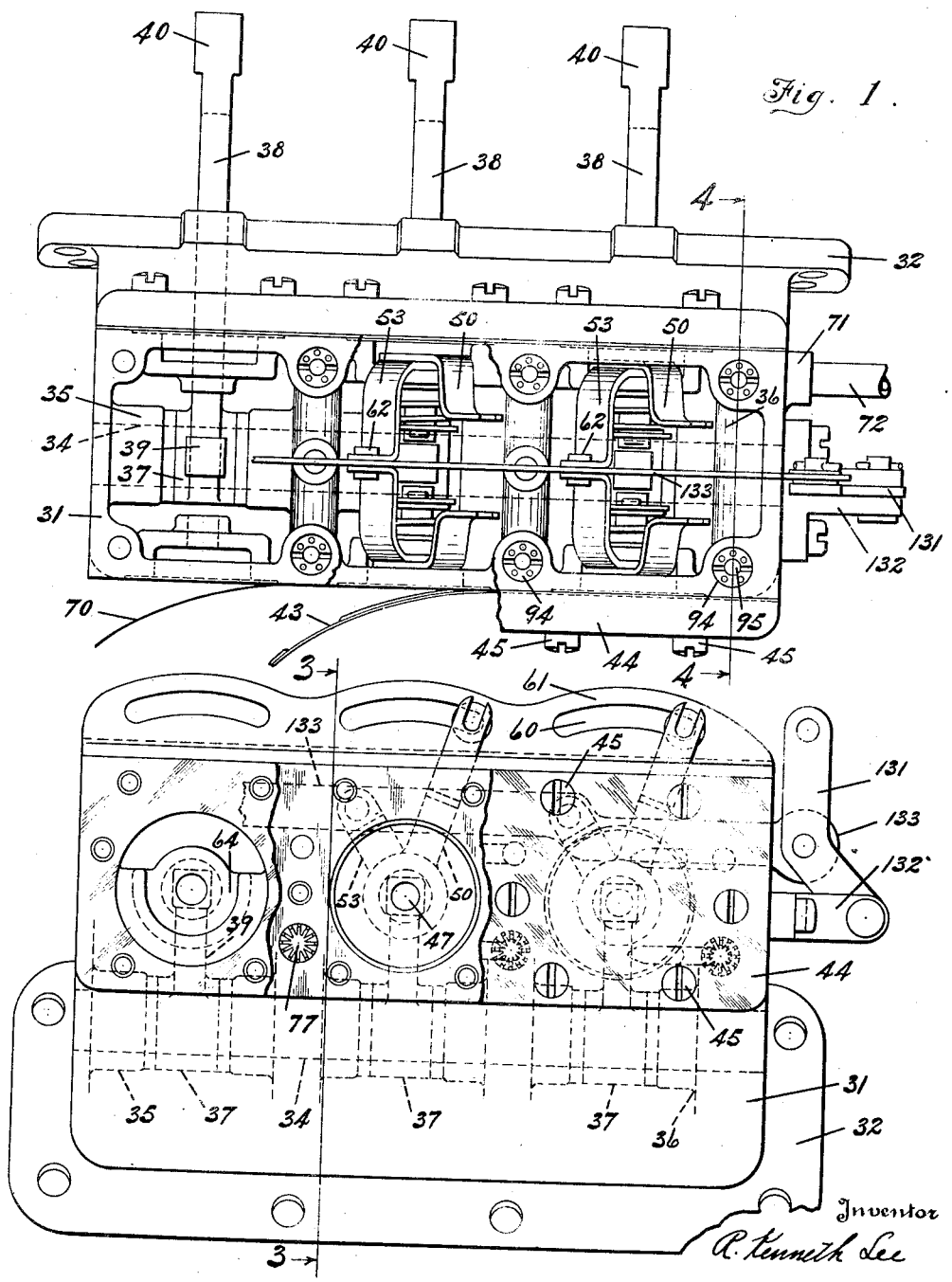
Fig. 1 is a plan view of the fuel pump, certain portions being removed and broken away to illustrate interior structures.
Fig. 2 is a fragmentary side view of the fuel pump, as per Fig. 1, taken on three planes, viz: the outside of cover, outside of diaphragm and against casing with cover and diaphragm taken away.

Referring to Figs. 1, 3 and 4, there is shown a longitudinal shaft 34 passing through the center of the housing, one end of the shaft being journaled in an extended portion 35 formed in one end of the housing, while the opposite end of the shaft is journaled in the end 36 of the housing, which as shown in Fig. 1, is of increased thickness to provide the bearing for this shaft and also a passageway for the intake valves as will be explained hereinafter. The shaft 34 supports the operating elements of the various pumping units. As can be seen from the drawings, the pumping units are arranged in pairs, that is, as shown in Fig. 14, units #2 and #3 comprise one pair; #4 and #5 another pair; and #6 and #1 another pair.

The operating element for each pair of pumping units includes a lever 37 having portions 38 and 39, angularly arranged relative to each other. The portion 39 is adapted to operate the pumps; the portion 38 is provided with a bifurcated end 40, said end extending into the crankcase of the engine and fit about a cam 41 carried by and secured to the cam shaft 27 of the engine.

In view of the fact that the construction of the various pumping units of the pump are similar in construction, only one of them will be explained for the sake of brevity.

Referring particularly to Figs. 1, 2, 3 and 12, the pump housing 31 is shown provided with an opening 42, which is adapted to receive the diaphragm element 43. This diaphragm element is held in position against the side of the pump housing 31 by means of the side plate 44 secured to said pump housing by screws 45. The diaphragm 43 has a central opening 46 which receives the one end of the stem 47, said stem being provided at this extreme end with a head 48 which abuts against the outer face of the diaphragm. A washer 49 is placed on the stem 47 adjacent the inside surface of the diaphragm 43 and is held against this surface of the diaphragm by means of the pump-adjusting cam lever 50 which is also mounted on the stem 47. In Fig. 10 a detailed perspective view of this lever may be observed. The inside surface of the hub portion of the lever which surrounds the stem 47 is provided with camming surfaces 51, which cooperate with adjacent similar camming surfaces 42 formed on the hub portion of the pump-regulating lever 53, for purposes hereinafter to be described.

As can be seen in the Figs. 3 and 10, the lever 50 is offset so that it will have a portion 54 parallel with the hub portion on which camming surfaces 51 are provided but lying in another plane. This portion 54 extends through an opening 55 in the cover plate 56 of the pump housing, the end thereof being provided with a slot 57 for receiving the stem 58 of the locking nut 59. This stem 58 also extends through an arcuate slot 60 formed in the one side of a U-shaped member 61, concentric with stem 47, see Fig. 11, and provides means for locking the lever 50 in any adjusted position. The lever 53 is shaped somewhat similar to the lever 50, the angular portion, however, being considerably shorter than the similar portion of said lever 50. The end of the lever 53 opposite the hub portion, is so constructed and arranged that it will extend practically to the center of the pump housing 31, where it will engage with an arm 133 supported between levers 53 of opposite pumping units. A stud 62 passes through openings 63 in both levers and the arm 133, thus connecting these three elements.

The hub portions of both of these levers are positioned between the washer 49 and the extending portion 64 formed on the side of the pump housing 31, the outer surface of lever 50 engaging with the washer while the outer surface of lever 53 engages with the side of the portion 64 as shown in Fig. 3. A transverse, bored-out opening in this extension 64 forms a bearing for the stem 47. This stem extends beyond the inner surface of the portion 64 and carries a washer 65 held on said stem by a pin 66. A coil spring 67 is supported on the stem, interposed between the portion 64 and the washer 65.

Spring 67 exerts a pressure on the washer 65 so that the stem 47 will normally tend to hold the diaphragm 43 in its extreme inner position. The stem 47 is of such a length that it is contiguous to the portion 39 of operating lever 37, when said lever is in its intermediate position, or more specifically, when said lever is not affecting either of its respective pumps. From the aforegoing it will be seen that when the lever 37 is operated in a counterclockwise direction about its supporting shaft 34, as regards Fig. 3, the element 39 will engage with the stem 47, moving said stem outwardly. Thus the washer 49 in engagement with the diaphragm, will move said diaphragm from its extreme inner position toward its outer position, which movement of the diaphargm may be termed its "ejecting stroke". Upon reverse movement of the lever 37, the spring 67 will cause a reversal of the movement of the diaphragm, which is termed its "intake stroke".

Operating the lever 50 about the stem 47 in one direction will cause the hub portion of said lever 50 to move away from the hub portion of the lever 53, due to the engaging cam surfaces 51 and 52 of the levers 50 and 53, respectively. Thus, the extreme inner position of the washer 49 and consequently the diaphragm 43 may be adjusted, thereby to limit the capacity of the pump output or delivery. Lock nut 59 cooperating with the U-shaped element 61, permits locking this lever 50 in the adjusted position. This lever, in the respective pumping units of the pump provides a means for equalizing the liquid fuel output of the various pump units of the pump, thus it is termed the "pump adjusting lever".

The lever 53, however, is so arranged that it is adaptable to be operated at any desired or necessary time. When said lever is rotated about the stem 47, the camming surfaces thereof cooperating with the camming surfaces of the adjacent lever 50, will move the hub portion of said lever 50 together with the washer 49 in either direction and, depending upon this relative cam cooperation will increase or decrease the stroke of the stem 47 for the purpose of increasing or decreasing respectively, the output of the pump. The inherent tension of the lever 50 will cause a return of said lever to its normally-adjusted position when the lever 53 is moved from a low-delivery position to the position in which the greatest fuel delivery of the pump is possible. From the aforegoing it may be seen that operating the lever 53 causes the space between it and lever 50 to vary. Said lever 50 being the limiting means for the movement of the diaphragm through the action of the spring 67, it follows that varying the position of lever 50 will in turn vary the limit of diaphragm stroke, thus varying the fuel output of this pumping unit.

As can be seen in Figs. 1 and 12, the diaphragms of the various pumping units on one side of the pump housing are shown formed out of a single piece of sheet metal. This sheet is held in position against the side of the pump housing 31 by means of the plate 44. A sheet of packing material 70 is interposed between the diaphragm and the housing 31 to eliminate liquid fuel leakage at this point.

Referring now particularly to Figs. 1, 3, 4, 4ª, 4ᵇ, 5, 6, 7, 7ª and 8, the fuel delivery passages of the pump unit will be described. The lug 71 formed on the pump housing and shown in Fig. 1, provides a connecting point for the pipe 72, which leads from a source of liquid fuel supply 73 shown in Fig. 14. The pump housing has a longitudinal passage 74 which communicates with the pipe 72 at the point of connection 71. Adjacent each pair of pump units which includes opposite pumps, as for instance pumps 2 and 3; 4 and 5; 6 and 1, there is provided a boss in the pump housing casting, which includes the transverse passage 75. Each end of this transverse passage is provided with a valve seat 76 for the intake valve 77. A spring 78 is located in this passage 75, one end of said spring is anchored to an eye carried by the intake valve of one pump, for example pump #3, while its opposite end is anchored to a similar eye carried by the intake valve of the opposite pump, for instance pump #2. Thus it will be seen that the intake valves of a pair of pumping units are normally held upon their seats by means of a common spring located within the fuel-conducting conduit 75 which conduit feeds both valves.

The valve chamber in which valve 77 is positioned, is of such a size that when suction is exerted on the valve 77 and it moves away from its seat, the surface of said valve will tend to engage with the corresponding surface of the plate 44. In order to permit free passage of fuel from one side of the valve to a passage 79 in the plate 44, the valve is provided with grooves 80 on its edge, and communicating grooves 81 on its outer surface, whereby engagement of the outer surface of the valve with the inner surface of the plate 44 will permit free flow of fuel at this point.

The passage 79, which as has been mentioned, communicates with the chamber of intake valve 77, also communicates with a chamber 82 in the plate 44, by means of a cross-channel 83 formed in said plate. The chamber 82 communicates with the space between the diaphragm 43 and the plate 44. Another chamber 84 similar to the chamber 82 is formed in the plate 44 and communicates with the space between the diaphragm and said plate, said chamber 84 having a cross passage 85 in said plate which forms communication with the chamber 86, also formed in the plate. This chamber 86 communicates with the passage 87 formed in a lug portion 88 of the pump housing 31. A valve seat 89 is provided at the outer end of the passage 87, upon which the exhaust valve 90 is adapted normally to rest. In the Fig. 7ª, a detailed view of this exhaust valve may be had, said figure showing notches 91 formed in the edge of said valve. This provides fuel passages through the edge of the valve, said edge being provided for the purpose of keeping the valve in its proper position in the exhaust valve chamber 92. A spring 93 is interposed between the exhaust valve 90 and an adjustable retaining cap 94. The spring 93 normally tends to hold the valve 90 against its seat 89. As shown in Figs. 7 and 8, the cap 94 is provided with passages 95 to permit the free flow of fuel from the chamber 92 into the space above the cap 94. A slot 96 permits the cap 94 to be adjusted by means of a screw driver. The passage above the cap 94 is screw-threaded, as shown at 97, for receiving the union 98 which forms a connection for injection pipe 99.

In Fig. 13 a modified form of exhaust valve is shown. Here the pump housing 31 is provided with a passage 31ª being screw-threaded to receive an exhaust valve casing 100. Casing 100 has a depending shell portion 101 which extends into the passage 31ª. The inner end of this shell portion 101 is screw-threaded to receive the valve seat cap 102 having a central passage 103. Exhaust valve 104, has peripheral fuel passages similar to the exhaust valve 90 and is held against its seat by means of a spring 105 interposed between said valve and a counterbore 106 in the ceiling of the shell portion 101. A passage 107, provided in nipple 109 formed on the casing 100, communicates with the exhaust valve chamber 108. The injection pipe 99 may be secured to the nipple 109 in any suitable manner. From this it will be seen that the exhaust valve assembly, which is all included in the valve casing 100, may be readily removed and replaced by another, if so desired.

As is particularly shown in Fig. 11, the pipe 99 has its one end communicating with the exhaust valve chamber 97, and has its other end communicating with a nozzle 110. This nozzle is mounted in the engine head in any suitable manner. In Fig. 11 it is shown mounted in the air conduit casing in such a manner that fuel directed through said nozzle will be delivered directly into the intake port of its respective cylinder and against the valve. A detailed view of the nozzle is had in Fig. 15, which shows a body portion 111 having a screw-threaded part 112 and a head portion 113. The body portion is restricted at the end opposite the head portion 113 and has an orifice 114 of predetermined size. A longitudinal passage 115 is formed in the body portion 111, said passage communicating with the orifice 114 at its one end and with a counterbored portion 116 in the head 113. A plunger 117 of lesser diameter than the passage 115, is provided in said passage, the lower end of the plunger being cone-shaped as at 118 and fitting into and against a seat formed in the passage 115. The upper end of the plunger 117 has a diaphragm element 119 secured thereto, the peripheral edge of said diaphragm being secured to the head 113 in any suitable manner,—the Fig. 15 showing a portion of the head spun over the peripheral edge of the diaphragm. This diaphragm is so arranged in the counterbored portion 116, that a space 120 of determined size, is provided between the bottom of the counterbore portion 116 and the diaphragm 119. A transverse passage 121 is formed in the head 113 and communicates with the passage 115. This passage 121 is counterbored and screw-threaded, as shown at 122 for receiving a connection carried by the one end of pipe 99.

Normally the diaphragm 119 will tend to hold the conical end of the plunger 117 against its seat to shut off communication between the passage 115 and the orifice 114. However, as soon as pressure is exerted in the passage 115, it will also be exerted against the inside surface of the diaphragm 119, tending to force it away from the counterbored portion 116 to increase the space 120, thereby tending to move the plunger 117 off its seat and complete communication between the passage 115 and the orifice 114.

The size of the orifice 114 is such that any pressure through the orifice 114 against the conical surface 118 of the plunger 117 will not be sufficient to overcome the action of the diaphragm 119 to hold said conical surface 118 on its seat. Thus, any pressures through said orifice 114 will not lift the plunger from its seat.

The means for controlling the air supply to the engine includes a manually-operable throttle valve 25 as has been mentioned heretofore. The present invention includes the idea of regulatng the amount of fuel delivery to the engine in accordance with engine conditions, be they load, speed or suction conditions.

This means is clearly illustrated in Fig. 11 and includes an air-tight chamber 125 in which a bellows 126 is positioned, said bellows being so constructed and arranged that any tendency to create sub-atmospheric condition in the chamber 125 will cause the bellows to collapse. A rod 127 is connected with said bellows and extends through the end of the air-tight chamber. When the bellows collapses, this rod will be moved in a direction of the arrow 128. A pipe 125ª forms communication between the air conduit 24, above the throttle 25, and the air-tight chamber 125. Thus an increase in suction in the air conduit 24 will create a sub-atmospheric condition in the chamber 125, causing bellows 126 to operate the rod 127 in one direction, while a decrease in suction in said conduit will cause said bellows to operate rod 127 another direction.

Rod 127 is connected with one end of a lever 129, the opposite end of said lever being connected to a shaft 130. This shaft 130 has its opposite end connected with the lever 131 by suitable linkage, said lever 131 being anchored between the corresponding pairs of arms 53, as shown in Fig. 3. Thus operation of the lever 131 will operate all the pump unit levers 53 in the pump, thereby to regulate the delivery capacity of the pumping units.

As has been mentioned heretofore, in engines of the overhead-valve type, it is desirable to arrange the nozzles 110 so that they will direct the liquid fuel directly into the intake port of the engine cylinder and against the inside surface of the intake valve, as shown in Fig. 11. The operation of the various pumping units are so timed relative to the cycles of their respective cylinders, that liquid fuel will be injected by the pump into the intake port of its respective cylinder before the valve is opened for the intake cycle of its respective cylinder.

In engines of the L-head type, it is desirable to arrange the nozzle 110 that it will also direct its fuel against its respective intake valve. However, the timing of the fuel injection by the pump is so arranged that the pumping unit will deliver its fuel charge to its respective intake port while said valve is being opened, for the intake cycle of its respective cylinder. Thus the liquid fuel will be conveyed into the cylinder through its intake port with the inrushing air.

In a six-cylinder engine, where the firing order would be cylinders #1, #4, #3, #6, #5 and #2, the pipes 99 forming communication between the pump and the various cylinders would be arranged as shown in Fig. 14. As viewed in Fig. 14, the cams 41 and operating levers 37 are so arranged that the pumping units will operate in the following sequence, #1, #4, #3, #6, #5 and #2.

The pump operates as follows:

Assuming that the engine is running, the levers 37 will be oscillated about the supporting shaft 34, so that when, for instance, the lever of pumps 2 and 3 is moved in a counterclockwise direction as viewed from the end of the pump opposite the controlling lever 131, the pump #2 will be moved through its ejection stroke, while the pump #3 will be operated by its spring 67 on its intake stroke. On reversal of the lever 37, the pump #3 will be moved by the portion 39 of said lever to eject its fuel, while the spring 67 will operate the pump #2 on its intake stroke. On this stroke of the pump #2, liquid will flow from the source of supply 73 through pipe 72, entrance 71 into passage 74 and passage 75. Suction caused by the movement of the diaphragm will move the valve 77 from its seat 76, permitting fuel to flow from the passage 75 through passages 80 and 81 in the valve 77, into passage 79, thence through cross-passage 83 of plate 44, through chamber 82 into the space between the diaphragm and the cap 44. Now, when the lever 37 moves the stem 47 and consequently the diaphragm 43, outwardly, the liquid in the space between the diaphragm and the cover 44 will be forced out through chamber 84, cross-passage 85, passage 86 into the passage 87, this fuel pressure lifting the valve 90 and passing into the exhaust valve chamber 92 from whence it will flow through the passages 95 into pipe 99, thence into and through passage 121 into passage 115, creating a pressure in this passage. Pressure in this passage will be exerted also upon the diaphragm 119, tending to force it outwardly, thereby lifting the plunger 17 from its seat, permitting the liquid fuel to be forced through the orifice 114 into the intake port of its respective cylinder.

This operation will take place in all the pumping units and if the levers 50 of the various pumps have been adjusted properly, each intake port of each cylinder will receive a substantially equal amount of liquid fuel. As soon as the valve 25 is operated to wide-open position, whereby the suction in the conduit 24 is substantially reduced, then the sub-atmospheric condition in the chamber 125 is also reduced, causing the bellows to expand and move the rod 127 in a direction opposite the arrow 128, thereby moving the shaft 130 in a clockwise direction relative to Fig. 11, and consequently moving the lever 131 so that its arm 133 will be moved inwardly toward the pump. This will move all the arms 53 in a counter-clockwise direction as regards Fig. 2, thereby tending to decrease the space between levers 50—53 and thus adjust the valve diaphragms of the pumping units that the stroke of said diaphragm will be increased and thereby increase the capacity output of the pump. On the other hand, if the suction in the air conduit 24 increases and consequently the sub-atmospheric condition in the chamber 125 is increased, the bellows 126 will be partially collapsed causing the rod 127 to move in a direction of the arrow 128, which in turn will cause the lever 131 to be moved away from the pump unit and thereby move the arm 133 to cause all the levers 53 to be moved in a clockwise direction, as regards Fig. 2, which movement of the levers will cause the space between levers 50 and 53 to be increased and thereby substantially reduce the stroke of the pump stems 47 and consequently the movement of the diaphragms, thus reducing the capacity output of the pumping units.

If it is found that one pumping unit is delivering more or less fuel than the others, the nut 59 of said unit is loosened and the lever 50 adjusted so that this pump will deliver an amount of fuel equal to the other pumping units. The nut then is tightened on the element 61 to maintain this adjustment.

While the forms of embodiment of the invention as herein disclosed, constitute preferred forms, it is to be understood that other forms might be adopted, all coming within the scope of the claims which follow.

What is claimed is as follows:

1. A fuel supply device for a two-cylinder internal-combustion engine, comprising in combination, an engine; a fuel pump including a housing adapted to be secured to the crankcase of the engine; a pair of fuel pumps in said housing; engine-actuated means for operating the pumps; an exhaust port for each pump; a common intake passage for both pumps; a separate intake valve for each pump; and a common means tending to hold both intake valves closed.

2. A fuel supply device for an internal-combustion engine, comprising in combination, an engine; a pump including a housing; a displacement member provided with a stem having a bearing in said housing; engine-actuated means for operating the displacement member; and engaging cam-faced adjustable members interposed between the displacement member and the pump housing, the operation of either of said members being adapted to limit the movement of the displacement member.

3. A fuel supply device for an internal combustion engine having an apertured crankcase, comprising in combination, a housing adapted to be secured to the engine crankcase so as to form a cover for the aperture therein; a rocker arm pivotally mounted in the housing and so constructed and arranged as to extend through the crankcase aperture and be operatively connected to the engine, said arm including an angular extension located within said housing; and a fluid displacement member in said housing, said member lying in the path of travel of the said angular extension of the rocker arm so as to be operated thereby.

4. A fuel supply device for an internal combustion engine having an apertured crankcase, comprising in combination, a housing adapted to be secured to the engine crankcase so as to form a cover for the aperture therein; a pair of oppositely disposed fluid displacement members arranged in spaced relation in said housing and a rocker arm pivotally mounted in said housing, said arm having angularly arranged portions one of which extends through the crankcase aperture and is operatively connected to the engine, the other extending into the space between the fluid displacement members so that it will alternately operate the said members.

5. A fuel supply device for an internal combustion engine having an apertured crankcase, comprising in combination, a cam shaft journaled in and driven by the engine; a housing adapted to be secured to the engine crankcase so as to form a cover for the aperture therein; two oppositely disposed fluid displacement members in the housing, said members being in axial alignment and in spaced relation; and a rocker arm pivotally mounted in said housing, said arm having angular portions one of which extends into the space between the fluid displacement members, the other extending through the aperture in the crankcase and having a bifurcated end engaging one of the cams of the engine cam shaft so that the rocker arm will be operated in a rocking manner to cause the one angular portion of said arm alternately to engage and operate the displacement members.

6. A fuel supply device for an internal combustion engine, comprising in combination, a housing; a fuel pump in said housing said pump including a reciprocating member; a pair of co-operating adjusting levers carried on the reciprocating member said levers having engaging camming faces so constructed and arranged that the operation of either lever relative to the other will vary the limit of travel of the reciprocating member; and engine driven means for operating the said reciprocating member.

7. A fuel supply device for a multi-cylinder internal combustion engine, comprising in combination, a housing; a plurality of fuel pumps in said housing, each fuel pump including a diaphragm having an operating stem slidably supported in said housing; a pair of adjustment levers rotatably mounted on the operating stem of each pump, said pairs of levers having engaging surfaces provided with cams cooperating in such a manner that the operation of either lever relative to the other will vary the limit of travel of the operating stem; a common means to which is attached the correlative levers of the pump; means for separately anchoring the other levers of the pump; and engine driven means for operating the pumps in proper sequence.

8. A fuel supply device for a multi-cylinder, internal combustion engine, comprising in combination, a housing having two of its opposite sides provided with apertures directly opposite; inwardly extending lug portions formed in the housing adjacent each aperture, said lugs having apertures in direct alignment; an intake passage in said housing having a check valve at each end thereof; separate exhaust passages in each side of the housing, each having its individual exhaust check valve; a metal gasket on each side of the housing said gasket having indented portions extending into each aperture in said housing, forming diaphragm portions in said apertures; a cover plate secured to each side of the housing having the gasket interposed between the housing and cover plate, each of said plates having passages forming communication between the intake passage of the housing and the space between the diaphragm portion of the gasket and the cover plate, and communication between said space and the exhaust passage respectively; a diaphragm operating stem slidably arranged in each aperture of the inwardly extending lugs of the housing, said stems having their free ends in spaced relation; and an engine operated rocker arm pivoted in the housing and extending into the space between the stems.

In testimony whereof I hereto affix my signature.

R. KENNETH LEE.